Jan. 5, 1926.

P. A. C. SILVER

CYCLE PLANE

Filed Sept. 4, 1925

1,568,095

Inventor
P. A. C. Silver,
By Clarence A. O'Brien
Attorney

Patented Jan. 5, 1926.

1,568,095

UNITED STATES PATENT OFFICE.

PIUS A. C. SILVER, OF NEW SMYRNA, FLORIDA.

CYCLE PLANE.

Application filed September 4, 1925. Serial No. 54,489.

*To all whom it may concern:*

Be it known that I, PIUS A. C. SILVER, a citizen of the United States, residing at New Smyrna, in the county of Volusia and State of Florida, have invented certain new and useful Improvements in a Cycle Plane, of which the following is a specification.

The present invention relates to a cycle plane, and has for its principal object to provide a structure including the features of a bicycle or motorcycle and an aeroplane.

Another important object of the invention is to provide a cycle plane of this nature having an operating mechanism for the land and air travelling units.

Another important object of the invention is to provide a rudder and stabilizer mechanism operatively associated with the steering wheel of the bicycle or motorcycle.

A still further important object of the invention is to provide a cycle plane of this invention which is exceedingly simple in its construction, strong and durable, efficient and reliable in operation, not likely to easily become out of order, easy to maniplate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing—

Figure 1:
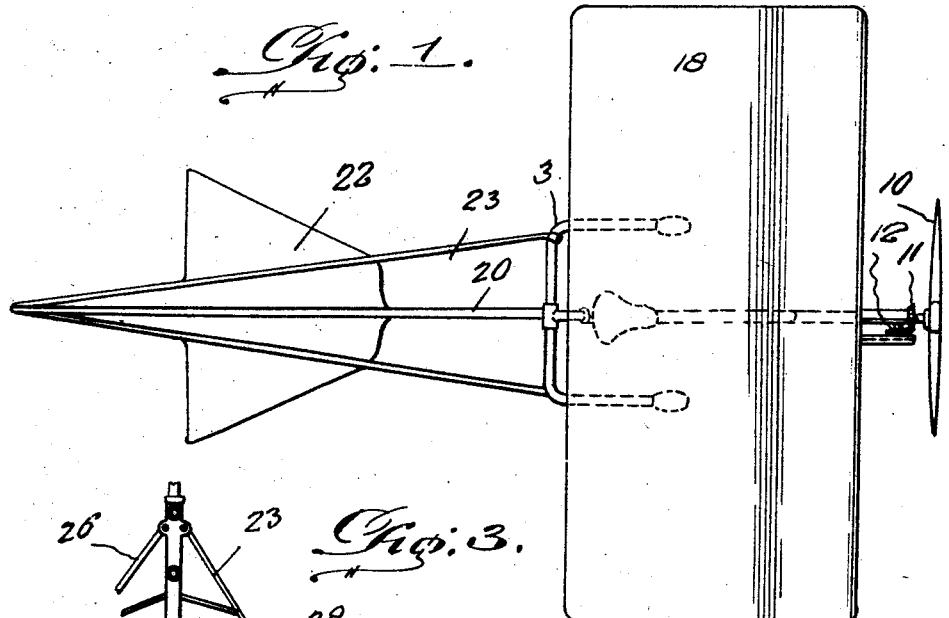
Figure 1 is a top plan view of the cycle plane.
Figure 3:
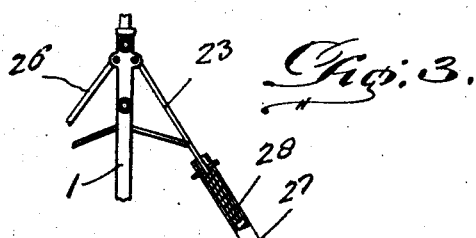
Fig. 3 is a detail view showing the land stabilizer.
Figure 2:
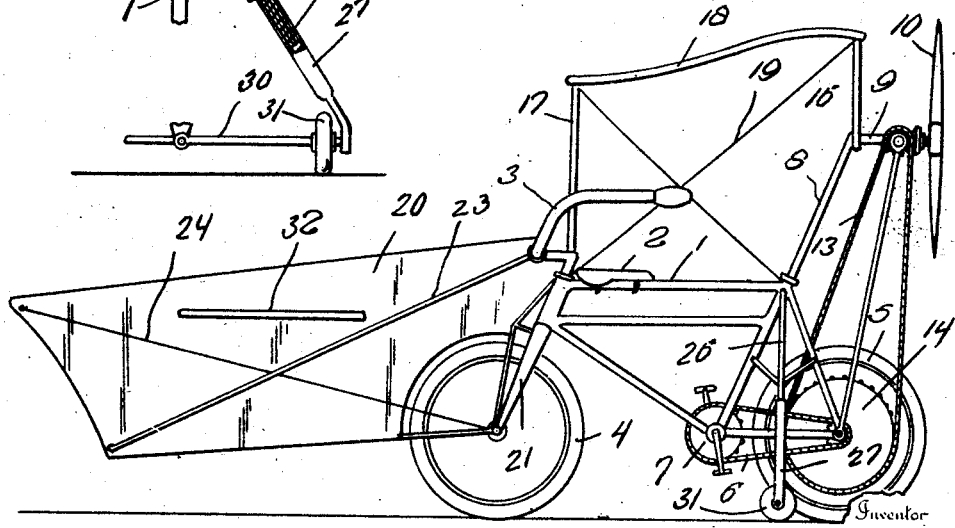
Fig. 2 is a side elevation thereof.

Referring to the drawing in detail, it will be seen that 1 designates generally the frame of a bicycle or motorcycle and the seat 2 is located thereon reversed as is ordinary, that is, located adjacent the handle bars 3 which are associated with the dirigible wheel 4. The drive 5 is operatively connected by a chain and sprocket mechanism 6 to the sprocket 7 or to the motor of a motorcycle. The parts thus far described are all more or less of conventional and well known construction.

A standard 8 is disposed with its lower end in the seat post of the frame 1 and rises upwardly and is inclined rearwardly. The upper end of the standard terminates in a rearwardly horizontally disposed extension 9 having rotatable therein the shaft of a propeller 10. A beveled gear 11 is on the shaft of the propeller shaft and meshes with the combined beveled gear and sprocket 12 operatively associated with a chain 13 trained over a sprocket 14 on the drive wheel 5. From this it will be seen that the propeller 10 is revolved when the drive wheel 5 rotates.

A frame 16 rises from the forward end of the extension 9 and a frame 17 rises from the frame 1. The frames 16 and 17 support a plane 18 which is braced by suitable guides 19. A rudder 20 is mounted on the handle bars 3 and the lower ends of the steering fork 21 so as to extend in a vertical plane or substantially vertical plane.

Stabilizers 22 extend from intermediate portions of the rudder 20 one on each side thereof and rectangularly thereto. Guide bars 23 are connected to the handle bars 3 and to the lower rear corner of the rudder 20. Guide ropes or cables 24 are attached to the rear upper corner of the rudder 20 and to the extremities of the fork 21.

Arms 26 extend downwardly and are inclined outwardly from the rear portion of the frame 1 and have tubular portions 27 telescopically associated therewith. Springs 28 are disposed in the tubular members 27 so as to normally hold them extended. A shaft 30 is disposed between the extremities of the tubular members 27 and have mounted thereon wheels 31, which function as land stabilizers for the device.

The rider mounted on the seat 2, faces toward the drive wheel 5, and propels the device through a motor or by foot. As the device moves along the ground picking up speed, the propeller 10 is rotating and it will gradually lift from the ground. When in the air, the device may be steered by operation of the handle bars 3.

It is thought that the construction, utility, and operation of the device will be clearly understood without a more detailed description thereof. It is apparent that changes in the details of construction, and in the combination and arrangement of parts may be resorted to without departing from the spirit or scope of the invention as hereinafter claimed, or sacrificing any of its advantages.

Having thus described my invention, what I claim as new is:—

In combination, a cycle frame, a steering fork on the frame, a seat on the frame adjacent the steering fork, handle bars connected with the steering fork, a dirigible wheel journaled in the steering fork, a drive wheel journaled in the frame, means for driving the drive wheel, a hollow standard extending upwardly from the frame and having an extension disposed above the drive wheel, a propeller shaft in the extension, a propeller on the shaft, a beveled gear on the shaft, a second beveled gear meshing with the first mentioned beveled gear, a sprocket fixed to the second beveled gear, a sprocket on the drive wheel, a chain trained over the sprocket, a plane supported above the frame, a rudder attached to the handle bar and to the fork, and stabilizers extending rectangularly from the rudder, one on each side thereof.

In testimony whereof I affix my signature.

PIUS A. C. SILVER.